(12) United States Patent
Wada (10) Patent No.: US 11,511,570 B2
(45) Date of Patent: Nov. 29, 2022

(54) TIRE

(71) Applicant: SUMITOMO RUBBER INDUSTRIES, LTD., Hyogo (JP)

(72) Inventor: Shoichi Wada, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 392 days.

(21) Appl. No.: 16/204,509

(22) Filed: Nov. 29, 2018

(65) Prior Publication Data

US 2019/0184762 A1    Jun. 20, 2019

(30) Foreign Application Priority Data

Dec. 15, 2017    (JP) .............................. JP2017-240839

(51) Int. Cl.
   *B60C 11/11*    (2006.01)
   *B60C 11/12*    (2006.01)
   (Continued)

(52) U.S. Cl.
   CPC ...... *B60C 11/1353* (2013.01); *B60C 11/0309* (2013.01); *B60C 11/1204* (2013.01);
   (Continued)

(58) Field of Classification Search
   CPC ............. B60C 11/1236; B60C 11/1353; B60C 11/1369; B60C 2011/0346;
   (Continued)

(56) References Cited

U.S. PATENT DOCUMENTS 3,727,661 A * 4/1973 Hoke .................... B60C 11/032
                                                152/209.22
5,088,536 A * 2/1992 Graas .................. B60C 11/1369
                                                152/902

(Continued)

FOREIGN PATENT DOCUMENTS

CN    107891709 A  *  4/2018
JP    62-194908 A  *  8/1987
(Continued)

OTHER PUBLICATIONS

Machine translation for Japan 2002-211210 (Year: 2020).*
(Continued)

*Primary Examiner* — Steven D Maki
(74) *Attorney, Agent, or Firm* — Greenblum & Bernstein, P.L.C.

(57) ABSTRACT

A tire includes a tread portion provided with at least one circumferentially extending zigzag main groove having a groove bottom, the at least one main groove including first inclined portions, second inclined portions each inclined in an opposite direction to the first direction, and first intersections where the first inclined portions and the second inclined portions are communicated with each other. The first inclined portions and the second inclined portions are arranged alternately in the tire circumferential direction. The first inclined portions are longer than the second inclined portions. The groove bottom of the at least one main groove is provided with at least one protruding part extending in a width direction of the at least one main groove, and a distance between the at least one protruding part and one adjacent first intersection is equal to or less than 2 times groove widths of the first intersections.

14 Claims, 4 Drawing Sheets

(51) Int. Cl.
  *B60C 11/13* (2006.01)
  *B60C 11/03* (2006.01)
(52) U.S. Cl.
  CPC .......... *B60C 11/1236* (2013.01); *B60C 11/13* (2013.01); *B60C 11/1369* (2013.01); *B60C 2011/0346* (2013.01); *B60C 2011/1213* (2013.01); *B60C 2011/133* (2013.01); *B60C 2011/1338* (2013.01); *B60C 2011/1361* (2013.01)
(58) Field of Classification Search
  CPC ....... B60C 2011/133; B60C 2011/1338; B60C 2011/1361
  See application file for complete search history.

(56) References Cited

U.S. PATENT DOCUMENTS

| | | | | |
|---|---|---|---|---|
| 5,957,180 | A * | 9/1999 | Kuramochi | B60C 11/13 152/902 |
| D791,690 | S * | 7/2017 | Ishigaki | D12/594 |
| 2014/0360641 | A1* | 12/2014 | Jacobs | B60C 11/11 152/209.21 |
| 2016/0089939 | A1 | 3/2016 | Oji | |
| 2017/0120691 | A1* | 5/2017 | Arai | B60C 11/1307 |
| 2017/0144488 | A1* | 5/2017 | Tanaka | B60C 11/12 |
| 2019/0100060 | A1* | 4/2019 | Hokazono | B60C 11/1204 |

FOREIGN PATENT DOCUMENTS

| | | | |
|---|---|---|---|
| JP | 05-338413 A | * | 12/1993 |
| JP | 2002-211210 A | * | 7/2002 |
| JP | 2016-064781 A | | 4/2016 |

OTHER PUBLICATIONS

Machine translation for China 107891709 (Year: 2022).*
Machine translation for Japan 05-338413 (Year: 2022).*
Machine translation for Japan 62-194908 (Year: 2022).*
U.S. Appl. No. 16/135,735 to Hiroki Hokazono, filed Sep. 19, 2018.

* cited by examiner

TIRE

BACKGROUND ART

Field of the Disclosure

The present disclosure relates to tires, and more particularly to a tire which is suitably used for snow traveling.

Description of the Related Art

Conventionally, in order to improve driving performance on snow (hereinafter, simply referred as "snow performance"), a tire having a tread portion which is provided with a circumferentially and continuously extending zigzag main groove has been known.

For example, the following Patent document 1 discloses a tire having a tread portion provided with a zigzag main groove which includes first shoulder inclined elements and second shoulder inclined elements inclined in an opposite direction to the first shoulder inclined elements, wherein the first and second shoulder inclined elements are arranged alternately in the tire circumferential direction, and the second shoulder inclined elements are shorter than the first shoulder inclined elements in circumferential length to generate large snow shearing force upon traveling on snow.

PATENT DOCUMENT

[Patent document 1] Japanese Unexamined Patent Application Publication 2016-064781

Unfortunately, in the tire disclosed in the Patent document 1, there has been a problem that some stones can be trapped during traveling around some intersections of the first and second shoulder elements and are not ejected. When one or more stones are kept being trapped in the main groove, steering stability and noise performance of the tire tends to deteriorate, and the tread portion may be broken, resulting in reduction in durability of the tire. Thus, regarding stone-biting resistance which is evaluated by the number of stones trapped in a tread main groove after traveling a certain distance, further improvement has been required even in tire which are directed to run on snow roads.

SUMMARY OF THE DISCLOSURE

In view of the above problems in the conventional art, the present disclosure has an object to provide a tire capable of improving snow performance and stone-biting resistance in a well-balanced manner.

According to one aspect of the disclosure, a tire includes a tread portion being provided with at least one circumferentially extending zigzag main groove having a groove bottom, the at least one main groove including first inclined portions each inclined in a first direction with respect to a tire circumferential direction, second inclined portions each inclined in a second direction which is an opposite direction to the first direction with respect to the tire circumferential direction, and first intersections where the first inclined portions and the second inclined portions are communicated with each other. The first inclined portions and the second inclined portions are arranged alternately in the tire circumferential direction. Lengths of the first inclined portions are longer than lengths of the second inclined portions. The groove bottom of the at least one main groove is provided with at least one protruding part extending in a width direction of the at least one main groove. A distance between the at least one protruding part and one adjacent first intersection is equal to or less than 2 times groove widths of the first intersections.

In another aspect of the disclosure, the at least one protruding part may include a first protrusion and a second protrusion, and the first protrusion may be located nearer to the one adjacent first intersection than the second protrusion.

In another aspect of the disclosure, the first protrusion may be higher than the second protrusion.

In another aspect of the disclosure, a height of the first protrusion may be in a range of from 15% to 30% of a groove depth of the at least one main groove at a location on which the first protrusion is provided.

In another aspect of the disclosure, a height of the second protrusion may be in a range of from 10% to 20% of a groove depth of the at least one main groove at a location on which the second protrusion is provided.

In another aspect of the disclosure, the at least one protruding part may be provided on both the first inclined portions and the second inclined portions.

In another aspect of the disclosure, the tread portion may further include land portions divided by the at least one main groove, wherein at least one of the land portions may be provided with a sipe in communication with the at least one main groove, and in a tread plan view, the at least one protruding part may be provided on a connecting portion where the sipe is in communication with the at least one main groove.

In another aspect of the disclosure, at least one stone ejector may be provided on one of groove walls the at least one main groove.

In another aspect of the disclosure, the at least one stone ejector may be formed into a step manner.

In another aspect of the disclosure, the at least one stone ejector may be provided with only an axially inner groove wall of the at least one main groove.

In another aspect of the disclosure, the at least one main groove may include second intersections where the first inclined portions and the second inclined portions are communicated with each other at locations axially inwardly of the first intersections, and the at least one stone ejector is provided on one end regions of the first inclined portions which are on the second intersections sides, or on one end regions of the second inclined portions which are on the second intersections sides.

DESCRIPTION OF THE PREFERRED EMBODIMENTS

Figure 1:
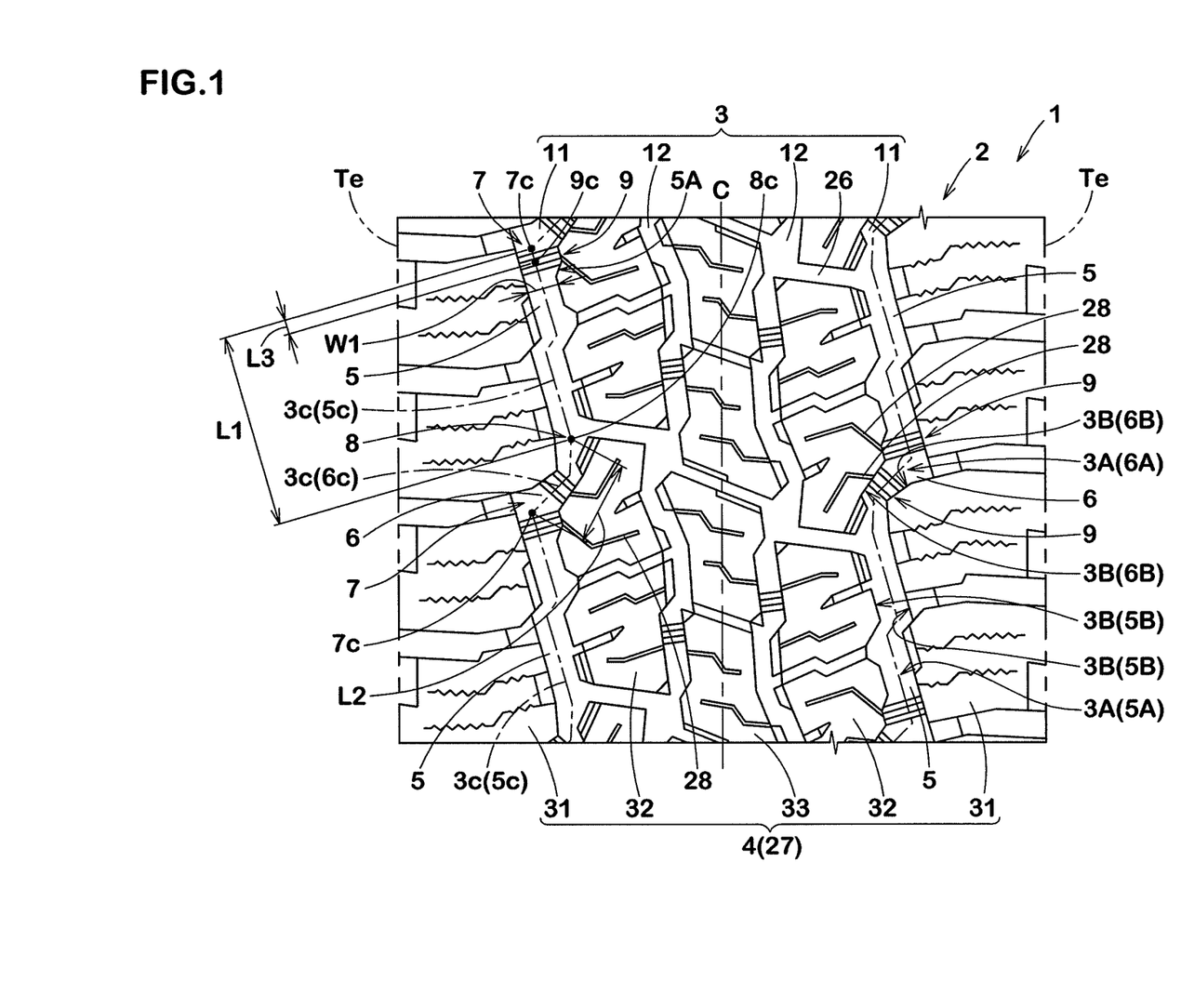
FIG. 1 is a development view of a tread portion in accordance with an embodiment of the disclosure.

An embodiment of the present invention will be explained below with reference to the accompanying drawings. FIG. 1 illustrates a development view of a tread portion 2 in accordance with an embodiment of the disclosure. The tire 1 in accordance with the embodiment, for example. may preferably be used for a pneumatic tire for SUV which is suitable for traveling on rough terrain. As illustrated in FIG.

1, the tire 1 according to the embodiment includes the tread portion 2 which is provided with at least one circumferentially extending zigzag main groove 3 and land portions 4 divided by the main groove 3.

Preferably, the main groove 3 includes first inclined portions 5 each inclined in a first direction with respect to the tire circumferential direction, and second inclined portions 6 each inclined in a second direction which is an opposite direction to the first direction with respect to the tire circumferential direction. In this embodiment, the main groove 3 further includes intersections where the first inclined portions 5 and the second inclined portions 6 are communicated with each other, wherein the intersections include first intersections 7 each protruding most to an axially first side, and second intersections 8 each protruding most to an axially second side. Further, the first intersections 7 and the second intersections 8 are arranged alternately in the tire circumferential direction.

In this embodiment, lengths L1 of the first inclined portions 5 are longer than lengths L2 of the second inclined portions 6. Here, each of the lengths L1 of the first inclined portions 5 is measured on the groove centerline 5c of the first inclined portion 5 as a distance between locations 7c and 8c of the adjacent first intersection 7 and second intersection 8, respectively, under a standard state of the tire 1. Further, each of the lengths L2 of the second inclined portions 6 is measured on the groove centerline 6c of the second inclined portion 6 as a distance between locations 7c and 8c of the adjacent first intersection 7 and second intersection 8, respectively, under the standard state of the tire 1.

In this embodiment, the locations 7c of first intersections 7 are intersection points where the groove centerlines 5c of the first inclined portions 5 and the groove centerlines 6c of the second inclined portions 6 intersect each other at the first intersections 7. Further, the locations 8c of second intersections 8 are intersection points where the groove centerlines 5c of the first inclined portions 5 and the groove centerlines 6c of the second inclined portions 6 intersect each other at the second intersections 8. The tire 1 with the main groove 3 as such, upon driving on snow, can generate large snow-shearing force to improve snow performance using the first inclined portions 5 and the second inclined portions 6 which are different in angle with respect to the tire circumferential direction.

As used herein, the standard state is such that the tire 1 is mounted on a standard wheel rim (not illustrated) with a standard pressure but is loaded with no tire load. Unless otherwise noted, dimensions of respective portions of the tire 1 are values measured under the standard state.

As used herein, the standard wheel rim is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, a standard tire load is a tire load officially approved for each tire by standards organizations in which the tire is based, wherein the standard tire load is the "maximum load capacity" in JATMA, the maximum value given in the above-mentioned table in TRA, the "Load Capacity" in ETRTO, for example.

The main groove 3 according to the embodiment includes a groove bottom 3A and two groove walls 3B each extending radially outwardly from the groove bottom 3A. Preferably, the groove bottom 3A of the main groove 3 is provided with at least one protruding part 9 extending in a width direction of the main groove 3. Note that a width direction of the main groove shall mean a direction perpendicular to the groove centerline 3c of the main groove 3 at the concerned location of the main groove 3.

The groove centerline 3s of the main groove 3 includes at least both centerlines 5c and 6c of the first inclined portions 5 and the second inclined portions 6, respectively. The groove bottom 3A of the main groove 3 includes groove bottom regions 5A of the first inclined portions 5 and groove bottom regions 6A of the second inclined portions 6. The groove walls 3B of the main groove 3 includes groove walls 5B of the first inclined portions 5 and groove walls 6B of the second inclined portions 6.

By providing the protruding part 9 on the main groove 3, snow traction can be increased due to snow-shearing as well as edge effect. Further, the protruding part 9 can not only prevent stones from being trapped in the main groove 3, but also push out stones from the main groove 3, improving stone-biting resistance. Since the protruding part 9 can enhance rigidity of the land portion 4, steering stability of the tire 1 on dry road condition can further be improved.

Figure 2:
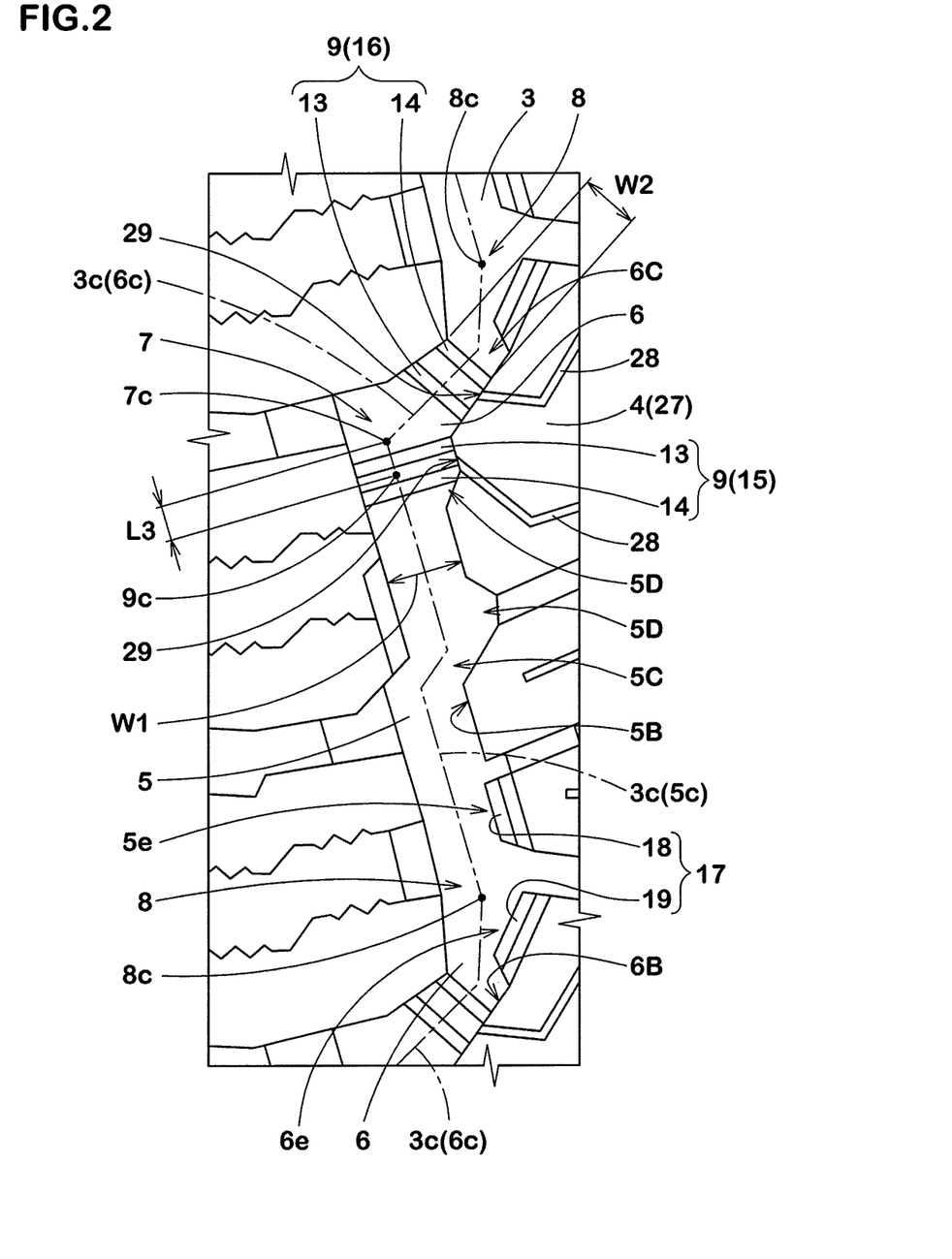
FIG. 2 is a partial enlarged view of a main groove of FIG. 1.

FIG. 2 illustrates a partial enlarged view of the main groove 3 shown in FIG. 1. As illustrated in FIG. 1 and FIG. 2, a distance L3 between the protruding part 9 and one adjacent first intersection 7 is equal to or less than 2 times groove widths W1 of the first inclined portions 5. Note that the distance L3 between the protruding part 9 and the one adjacent first intersection 7 is a distance from a middle location 9c of the protruding part 9 to the location 7c of the one adjacent first intersection 7. Further, note that the middle location 9c of the protruding part 9 is a middle location of the protruding part 9 on and along the groove centerline 3c of the main groove 3. The groove widths W1 of the first inclined portions 5 are groove widths at locations except for expanded width portions 5D of the first inclined portions 5 which will be described later.

The protruding part 9 can enhance tread rigidity around said adjacent first intersection 7, improving stone-biting resistance of the tire 1. Further, the protruding part 9 can improve snow performance of the tire 1 due to its edge effect. Thus, the tire 1 according to the embodiment can improve snow performance and stone-biting resistance in a well-balance manner.

As illustrated in FIG. 2, in some preferred embodiments, each of the first inclined portions 5, for example, includes a first bent portion 5C. Preferably, the first bent portion 5C may be formed so as not to interfere moving of snow in a groove longitudinal direction of the first inclined portions 5. Thus, when driving on snow, snow in the first inclined portions 5 can be compressed on the first intersections 7 side or the second intersections 8 side to be formed into hard snow columns.

Each of the first inclined portions 5, for example, includes a plurality of expanded width portions 5D. The respective expanded width portions 5D, for example, are arranged adjacent to the first intersections 7 and the first bent portion 5C. The first inclined portions 5 as such can compress snow using the expanded width portions 5D to form hard snow columns therein.

Each of the second inclined portions 6, for example, includes a second bent portion 6C. Preferably, each of the second inclined portions 6 has a minimum groove width W2 at the second bent portion 6C. Snow in the second inclined portion 6 can be compressed at the second bent portion 6C side to be formed into a hard snow column.

Figure 3:
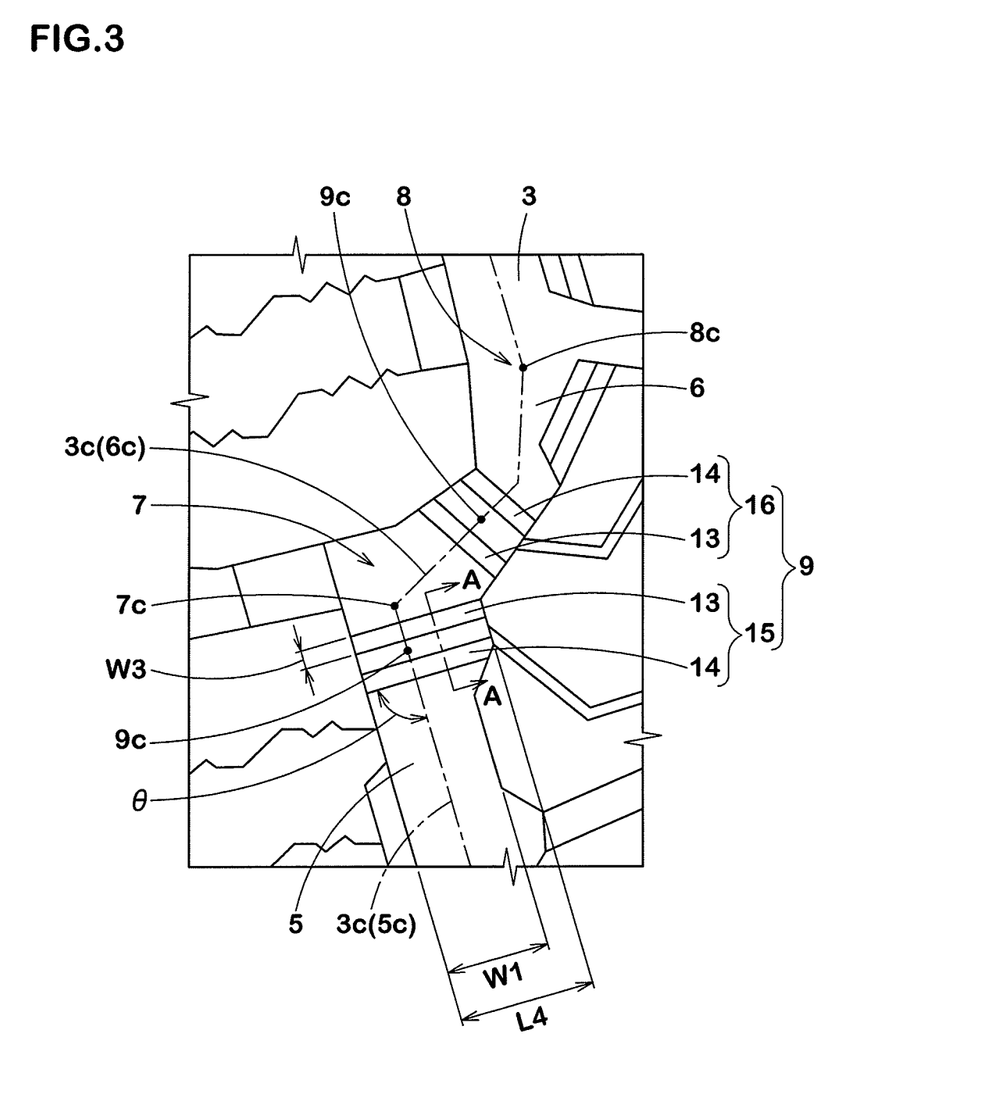
FIG. 3 is a partial enlarged view of a first intersection and a second intersection of FIG. 2.

FIG. 3 illustrates a partial enlarged view of FIG. 2 for showing one first intersection 7 and one adjacent second intersection 8. As illustrated in FIG. 3, in this embodiment, at least one protruding part 9 provided on one first inclined portion 5 is configured to include a first protrusion 13 and a second protrusion 14 which are adjacent with each other. The first protrusion 13 is located nearer to one adjacent first intersection 7 than the second protrusion 14. That is, the second protrusion 14 is located far away from the one adjacent first intersection 7. In this case, the middle location 9c of the protruding part 9 is defined as a middle location between the first protrusion 13 and the second protrusion 14 in a direction along the groove centerline 3c of the main groove 3.

Preferably, the first protrusion 13 and the second protrusion 14, in a tread plan view, are configured to have a narrow rectangular shape which extends in the groove width direction of the first inclined portion 5. The first protrusion 13 of the first inclined portion 5, for example, includes a length L4 in the groove width direction of the first inclined portion 5 and a width W3 in a direction along the groove centerline 5c of the first inclined portion 5. The width W3 of first protrusion 13 according to the embodiment is smaller than the length L4 of the first protrusion 13. Preferably, the second protrusion 14, in a tread plan view, has a substantially same shape as the first protrusion 13.

Preferably, the first protrusion 13 and the second protrusion 14 provided on the first inclined portion 5 may be arranged on one of the expanded width portions 5D which is adjacent to one first intersection 7c. Since the first protrusion 13 according to the embodiment has the length L4 longer than the groove width W1 of the first inclined portion 5, the first protrusion 13 and the second protrusion 14 exert high edge effect upon driving on snow, improving snow performance of the tire 1.

Preferably, the first protrusion 13 and the second protrusion 14 extend at an angle θ of from 80 to 100 degrees with respect to the groove centerline 3c of the main groove 3. Preferably, the first protrusion 13 and the second protrusion 14 extend in substantially parallel with each other. The first protrusion 13 and the second protrusion 14 as such exert high edge effect upon driving on snow, improving snow performance of the tire 1.

Figure 4:
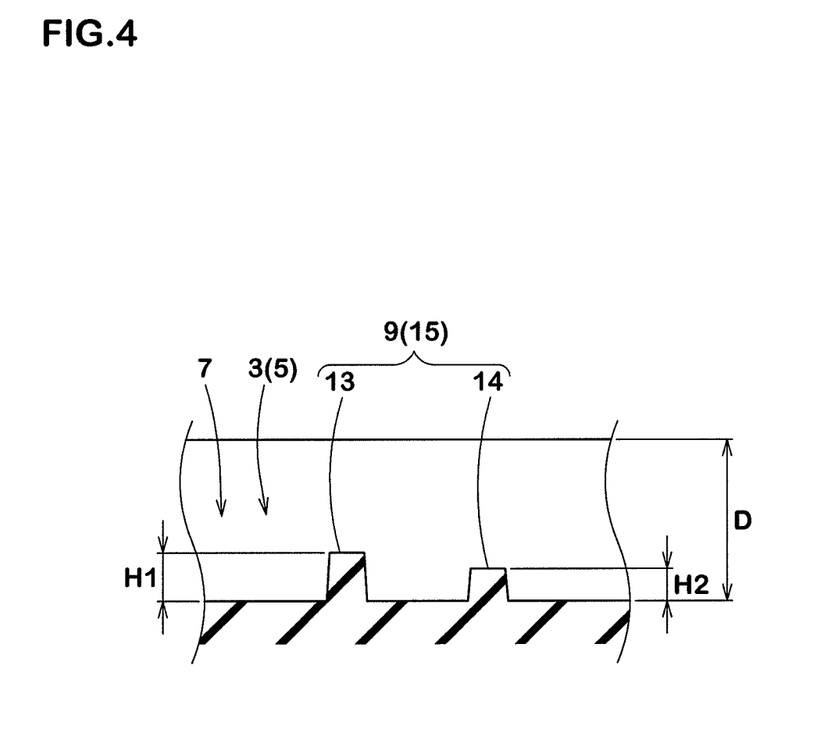
FIG. 4 is a cross-sectional view taken along line A-A of FIG. 3.

FIG. 4 illustrates a cross-sectional view taken along line A-A of FIG. 3. As illustrated in FIG. 4, preferably, a height H1 of the first protrusion 13 is higher than a height H2 of the second protrusion 14. Such a combination of the first protrusion 13 and the second protrusion 14 can push stones out from the main groove 3 effectively when traction or braking force is applied, improving stone-biting resistance of the tire 1.

Preferably, the height H1 of the first protrusion 13 is in a range of from 15% to 30% of a depth D of the main groove 3 at a location on which the first protrusion 13 is provided, i.e. the first inclined portion 5 in the embodiment. When the height H1 of the first protrusion 13 is less than 15% of the depth D of the first inclined portion 5, stone-biting resistance may not be improved. On the other hand, when the height H1 of the first protrusion 13 is more than 30% of the depth D of the first inclined portion 5, edge effect thereof may not be exerted due to lack of rigidity of the first protrusion 13.

Preferably, the height H2 of the second protrusion 14 is in a range of from 10% to 20% of a depth D of the main groove 3 at a location on which the second protrusion 14 is provided, i.e. the first inclined portion 5 in the embodiment. When the height H2 of the second protrusion 14 is less than 10% of the depth D of the first inclined portion 5, stone-biting resistance may not be improved. On the other hand, when the height H2 of the second protrusion 14 is more than 20% of the depth D of the first inclined portion 5, the height difference between H1 and H2 tends to be small, and thus stone-biting resistance may not be improved.

As illustrated in FIG. 2 and FIG. 3, the at least one protruding part 9 according to the embodiment may be provided on both the first inclined portions 5 and the second inclined portions 6. In some preferred embodiments, the at least one protruding part 9 may include primary first protruding parts 15 provided on the first inclined portions 5 and secondary protruding parts 16 provided on the second inclined portions 6. Each of the primary protruding parts 15, for example, includes the first protrusion 13 and the second protrusion 14. Similarly, each of the secondary protruding parts 16, for example, includes the first protrusion 13 and the second protrusion 14. In another aspect, the primary protruding parts 15 may be configured to include both the first protrusion 13 and the second protrusion 14, and the secondary protruding parts 16 may be configured to include only the first protrusions 13.

In this embodiment, since one primary protrusion 15 and one secondary protruding parts 16 are arranged on both sides of the respective first intersections 7, stone-biting into the first intersections 7 can surely suppressed, improving stone-biting resistance of the tire 1. Further, since the primary protruding parts 15 are provided on the first inclined portions 5 which are inclined at small angles with respect to the tire circumferential direction, the primary protruding parts 15 can improve snow-searing force as well as edge effect, thus improving snow performance of the tire 1.

As illustrated in FIG. 2, preferably, one or more stone ejectors 17 are provided on the groove walls 5B and 6B of the first inclined portions 5 and the second inclined portions 6, respectively. The stone ejectors 17 are arranged on one end regions 5e and 6e of the first and second inclined portions 5 and 6, respectively, which are on the second intersections 8 sides. The stone ejectors 17, for example, are formed into a step manner which includes two different height steps from the groove bottom 3A of the main groove 3. The stone ejectors 17 can be useful to eject stones trapped in the second intersections 8 at early stage, improving stone-biting resistance of the tire 1.

The stone ejectors 17, for example, include first stone ejectors 18 formed on the groove walls 5B of the first inclined portions 5, and second stone ejectors 19 formed on the groove walls 6B of the second inclined portions 6. The first and second stone ejectors 18 and 19 make it possible to eject stones trapped in the second intersections 8 surely, further improving stone-biting resistance of the tire 1.

As illustrated in FIG. 1, at least one main groove 3 may include a pair of shoulder main grooves 11 adjacent to the respective tread edge Te, and at least one crown main groove 12 arranged axially inwardly of the shoulder main grooves 11. In this embodiment, a pair of crown main grooves 12 are provided such that the tire equator C is located therebetween. In this embodiment, the shoulder main grooves 11 correspond to the at least one main groove 3 on which the above-mentioned first inclined portions 5, second inclined portions 6, first intersections 7 and second intersections 8 are provided. In this embodiment, the second intersections 8 are located axially inwardly with respect to the first intersections 7.

As used herein, the tread edges Te are defined as axially outermost edges of the ground contacting patch of the tread portion 2 of the tire 1 which occurs under the standard state with the standard tire load when the camber angle of the tire is zero. The axial center location between the tread edges Te is defined as the tire equator C.

The land portions 4 according to the embodiment may include shoulder land portions 31, middle land portions 32, and a crown land portion 33. The respective shoulder land portions 31, for example, are disposed axially outside the respective shoulder main grooves 11. The respective middle land portions 32, for example, are divided between one shoulder main groove 11 and one adjacent crown main groove 12 on each side of the tire equator C. The crown land portion 33, for example, is divided between crown main grooves 12.

In this embodiment, each of the land portions 4, is divided into a plurality of blocks 27 by lateral grooves 26 traversing each land portion 4. Preferably, the plurality of blocks 27 is provided with a plurality of sipes 28 communicated with one of the main grooves 3.

As illustrated in FIG. 2, each protruding part 9, in a tread plan view, is provided on a connecting portion 29 where one sipe 28 is in communication with the main groove 3. That is, on both sides of each connecting portion 29, one first protrusion 13 and one second protrusion 14 exist. Since a land portion around each connecting portion 29 tends to elastically deform easily upon driving, the above configuration of protruding part 9 further promotes to eject stones trapped in the main groove 3, improving stone-biting resistance.

While the particularly preferable embodiments in accordance with the present disclosure have been described in detail, the present disclosure is not limited to the illustrated embodiments but can be modified and carried out in various aspects.

EXAMPLE

Tires with a basic tread pattern as shown in FIG. 1 were manufactured by way of trial based on the specification in Tables 1 and 2. Then, a test driver drove a test vehicle having four wheels equipped with the test tires to evaluate stone-biting resistance and snow performance. The common specification of the test tires and the testing procedures are as follows.

Test vehicle: large class SUV
Tire size: 265/70R17
Rim size: 17×7.5 J
Tire inner pressure: 240 kPa Stone-Biting Resistance Test:

After the test driver drove a rough terrain course covered with small stones and rubble for 1500 km, the number of stones trapped in the test tires was measured. The test results are shown in Tables 1 and 2 using an index in which the reciprocal value of the measurement value of comparative example (Ref. 1) is assumed to be 100. The larger numeric value indicates better stone-biting resistance.

Snow Performance Test:

A test driver drove the test vehicle on a compressed snow road, and traction and braking property of the vehicle was measured using a measurement device mounted on the test vehicle. The test results are shown in Tables 1 and 2 using an index in which the measurement value of comparative example (Ref. 1) is assumed to be 100. The larger numeric value indicates better snow performance.

Tables 1 and 2 show the test results.

TABLE 1

|  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- |
| Primary protruding parts | none | presence | presence | presence | presence | presence | presence | presence |
| Secondary protruding parts | none | none | none | presence | none | presence | none | presence |
| Stone ejectors | none | none | none | none | none | none | none | none |
| Ratio L3/W1 | — | 5 | 1 | 1 | 1 | 1 | 1 | 1 |
| Ratio H1/D (%) | — | 15 | 15 | 15 | 15 | 15 | 25 | 25 |
| Ratio H2/D (%) | — | — | — | — | 15 | 15 | 15 | 15 |
| Stone-biting resistance (index) | 100 | 100 | 105 | 110 | 110 | 115 | 115 | 120 |
| Snow performance (index) | 100 | 105 | 110 | 110 | 115 | 115 | 115 | 120 |

TABLE 2

|  | Ex. 7 | Ex. 8 | Ex. 9 | Ex. 10 | Ex. 11 | Ex. 12 |
| --- | --- | --- | --- | --- | --- | --- |
| Primary protruding parts | presence | presence | presence | presence | presence | presence |
| Secondary protruding parts | none | presence | none | presence | none | presence |
| Stone ejectors | presence | presence | presence | presence | presence | presence |
| Ratio L3/W1 | 1 | 1 | 1 | 1 | 1 | 1 |
| Ratio H1/D (%) | 15 | 15 | 15 | 15 | 25 | 25 |
| Ratio H2/D (%) | — | — | 15 | 15 | 15 | 15 |
| Stone-biting resistance (index) | 110 | 115 | 115 | 120 | 120 | 125 |
| Snow performance (index) | 110 | 110 | 115 | 115 | 115 | 120 |

From the test results, it is confirmed that the example tires improve stone-biting resistance and snow performance.

What is claimed is:

1. A tire comprising:
    a tread portion being provided with at least one circumferentially extending zigzag main groove having a groove bottom, the at least one main groove comprising first inclined portions each inclined in a first direction with respect to a tire circumferential direction, second inclined portions each inclined in a second direction which is an opposite direction to the first direction with respect to the tire circumferential direction, and first intersections where the first inclined portions and the second inclined portions are communicated with each other;
    the first inclined portions and the second inclined portions arranged alternately in the tire circumferential direction;
    lengths of the first inclined portions being longer than lengths of the second inclined portions; and
    the groove bottom of the at least one main groove being provided with at least one protruding part extending in a width direction of the at least one main groove, a distance between the at least one protruding part and one adjacent first intersection being equal to or less than two times groove widths of the first intersections, wherein
    the at least one protruding part comprises a plurality of protruding parts,
    the plurality of protruding parts is arranged in such a manner that a single protruding part is arranged on a respective one of the first inclined portions,
    each protruding part consists of a first protrusion and a second protrusion, and the first protrusion is located nearer to the one adjacent first intersection than the second protrusion,
    each first inclined portion comprises a plurality of expanded width portions, and
    the first protrusion and the second protrusion are arranged within a region of one of the plurality of expanded portions.

2. The tire according to claim 1, wherein
    the first protrusion is higher than the second protrusion.

3. The tire according to claim 2, wherein
    a height of the first protrusion is in a range of from 15% to 30% of a groove depth of the at least one main groove at a location on which the first protrusion is provided.

4. The tire according to claim 1, wherein
    a height of the first protrusion is in a range of from 15% to 30% of a groove depth of the at least one main groove at a location on which the first protrusion is provided.

5. The tire according to claim 1, wherein
    a height of the second protrusion is in a range of from 10% to 20% of a groove depth of the at least one main groove at a location on which the second protrusion is provided.

6. The tire according to claim 1, wherein
    each protruding part is provided on both the first inclined portions and the second inclined portions.

7. The tire according to claim 1, the tread portion further comprising land portions divided by the at least one main groove, wherein
    at least one of the land portions is provided with a sipe in communication with the at least one main groove, and
    in a tread plan view, the at least one protruding part is provided on a connecting portion where the sipe is in communication with the at least one main groove.

8. The tire according to claim 1, wherein
    at least one stone ejector is provided on one of groove walls the at least one main groove.

9. The tire according to claim 8, wherein
    the at least one stone ejector is formed into a step manner.

10. The tire according to claim 8, wherein
    the at least one stone ejector is provided with only an axially inner groove wall of the at least one main groove.

11. The tire according to claim 8, wherein
    the at least one main groove comprises second intersections where the first inclined portions and the second inclined portions are communicated with each other at locations axially inwardly of the first intersections, and
    the at least one stone ejector is provided on one end regions of the first inclined portions which are on the second intersections sides.

12. The tire according to claim 8, wherein
    the at least one main groove comprises second intersections where the first inclined portions and the second inclined portions are communicated with each other at locations axially inwardly of the first intersections, and
    the at least one stone ejector is provided on one end regions of the second inclined portions which are on the second intersections sides.

13. The tire according to claim 11, wherein
    the at least one stone ejector is provided on one end regions of the second inclined portions which are on the second intersections sides.

14. The tire according to claim 1, wherein
    each second inclined portion comprises a second bent portion where the second inclined portion is bent in a V-shaped manner, and
    each second inclined portion has a minimum groove width at the second bent portion.

* * * * *